United States Patent [19]
Shirochi

[11] Patent Number: 5,155,477
[45] Date of Patent: Oct. 13, 1992

[54] VIDEO SIGNAL DISPLAY APPARATUS WITH A LIQUID CRYSTAL DISPLAY UNIT

[75] Inventor: Yoshiki Shirochi, Chiba, Japan
[73] Assignee: Sony Corporation, Tokyo, Japan
[21] Appl. No.: 446,018
[22] Filed: Nov. 14, 1989

[30] Foreign Application Priority Data

Nov. 18, 1988 [JP] Japan .................................. 63-291932
Nov. 29, 1988 [JP] Japan .................................. 63-331968

[51] Int. Cl.$^5$ ......................... G09G 3/00; H04N 5/92
[52] U.S. Cl. ..................... 340/784; 340/805; 358/310
[58] Field of Search ............... 358/236, 140, 230, 165, 358/85, 310; 350/333, 350 S; 340/784, 805, 814, 783; 364/518; 360/32

[56] References Cited

U.S. PATENT DOCUMENTS

| | | | |
|---|---|---|---|
| 3,662,101 | 5/1972 | Segerstrom . | |
| 4,660,030 | 4/1987 | Maezawa | 340/805 |
| 4,710,826 | 12/1987 | Sakurai | 360/32 |
| 4,754,271 | 6/1988 | Edwards | 340/784 |
| 4,845,482 | 7/1989 | Howard et al. | 340/784 |
| 4,853,765 | 8/1989 | Katsumata et al. | 358/140 |
| 4,901,066 | 2/1990 | Kobayashi et al. | 340/784 |
| 4,908,710 | 3/1990 | Wakai et al. | 358/236 |

FOREIGN PATENT DOCUMENTS 0181174 5/1986 European Pat. Off. .
58-107782 6/1983 Japan .

Primary Examiner—Alvin E. Oberley
Assistant Examiner—Steve Saras
Attorney, Agent, or Firm—Alvin Sinderbrand; William S. Frommer

[57] ABSTRACT

In a video signal display apparatus having a liquid crystal display unit with liquid crystal cells arranged in a matrix for displaying a display signal developed from an input video signal, the supplying of a scanning signal to the liquid crystal display unit is inhibited during a period in which an unnecessary portion of the video signal is provided, for example, as when the input video signal is derived from a VTR in a variable speed reproducing mode, and, during such inhibition of the supplying of the scanning signal to the liquid crystal display unit, the latter is made to continuously display the display signal previously supplied to the liquid crystal cells.

10 Claims, 8 Drawing Sheets

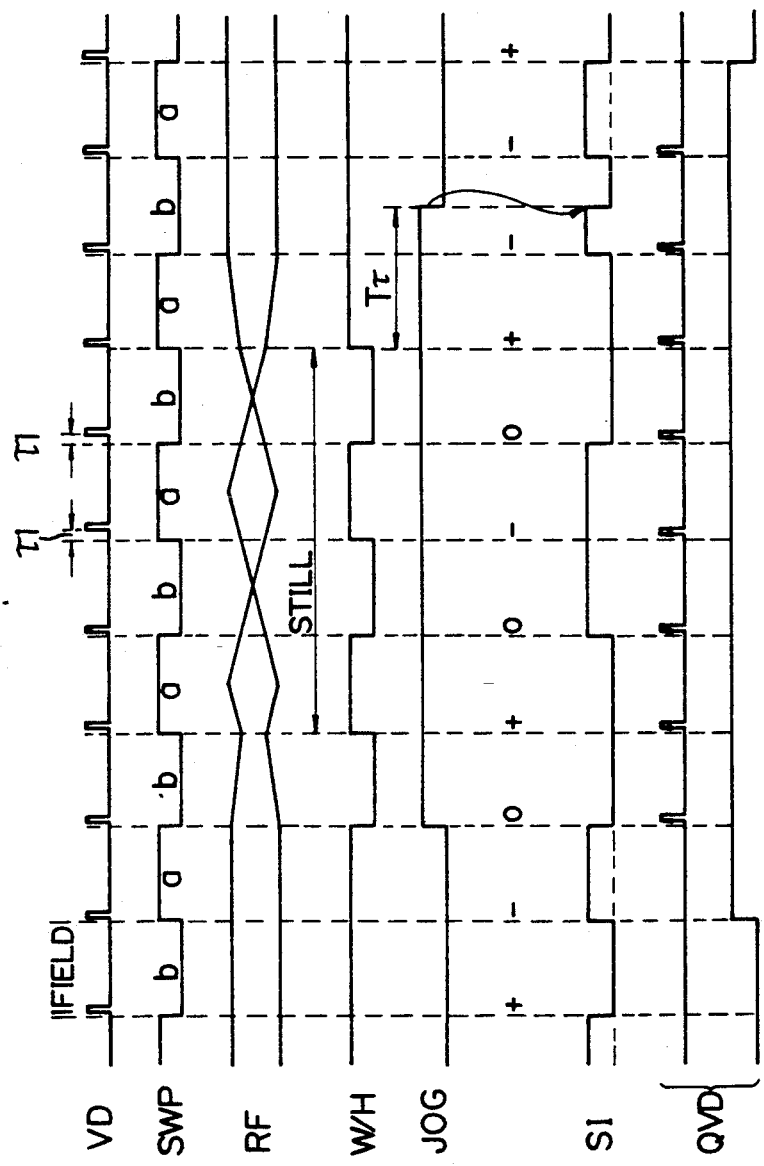

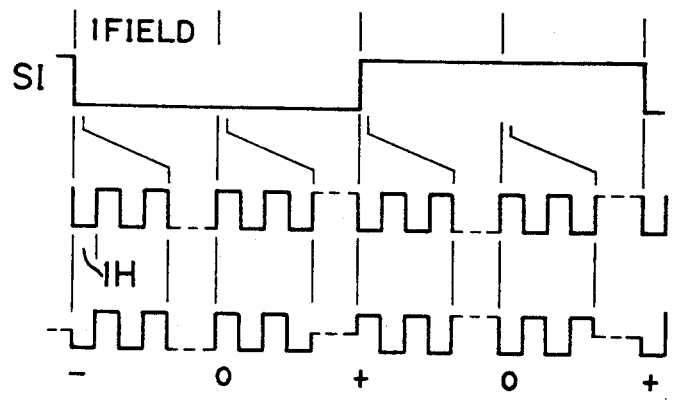
Fig.7A
Fig.7B
Fig.7C
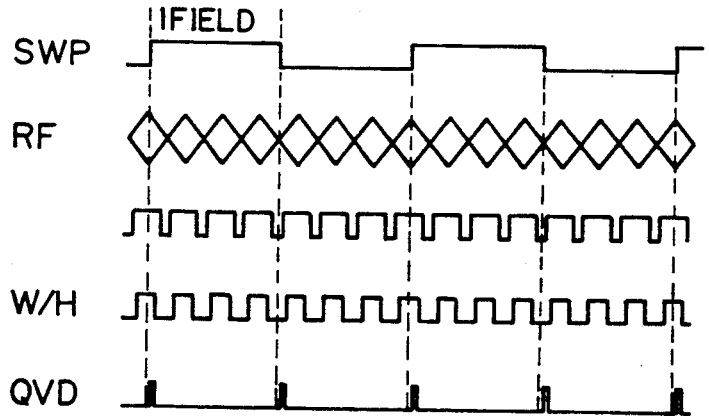
Fig.10A SWP
Fig.10B RF
Fig.10C
Fig.10D W/H
Fig.10E QVD

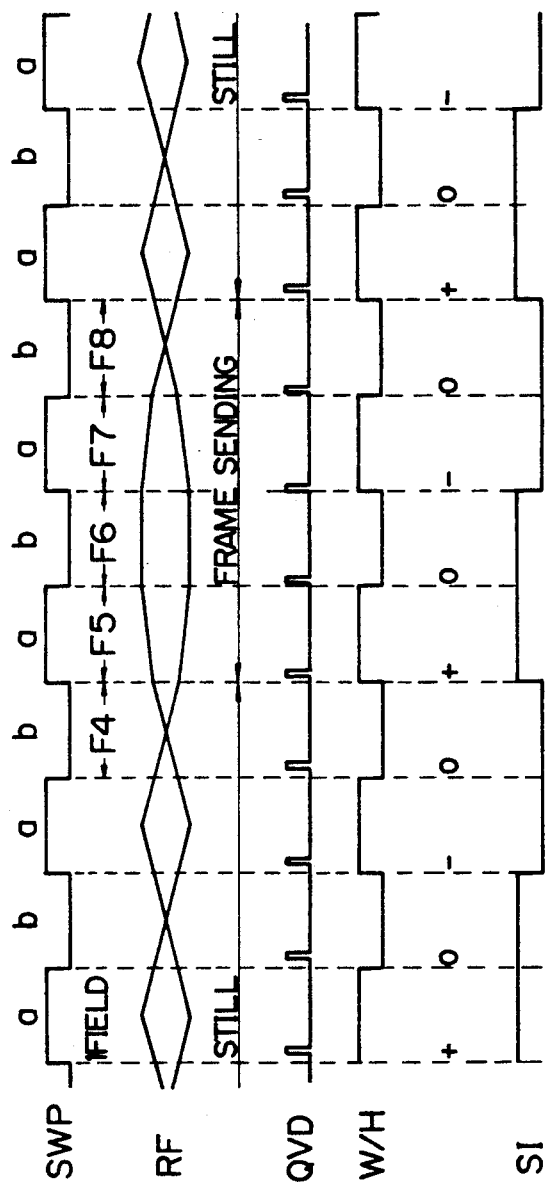

VIDEO SIGNAL DISPLAY APPARATUS WITH A LIQUID CRYSTAL DISPLAY UNIT

BACKGROUND OF THE INVENTION

1. Field of the Invention

This invention relates generally to a video signal display apparatus, and, more particularly, is directed to a video signal display apparatus with a liquid crystal display unit for displaying a video signal reproduced by a video tape recorder (VTR).

2. Description of the Prior Art

A compact video signal display apparatus is known in which a small-sized rotary head VTR and a liquid crystal display unit are integrated in a common housing. The liquid crystal display unit may have a simple matrix system for directly driving the liquid crystal cells by respective matrix electrodes, or an active matrix system may be employed which has switching elements inserted between the liquid crystal cells and the electrodes. Such active matrix system may be of a three-terminal type using transistors as the switching elements, or of a two-terminal type in which non-linear resistance elements, such as, diode rings, back-to-back diodes, or metal-insulated-metal (MIM) diodes are used.

It is desirable that the liquid crystal display unit be capable of displaying a video signal reproduced by a VTR in a variable speed reproducing mode, as well as in a normal reproducing mode. In the variable speed reproducing mode, the VTR reproduces the video signal recorded in slant tracks on a magnetic tape while the tape is being transported at a speed different from that used during recording. For example, in the variable speed reproducing mode, the VTR may effect still reproduction, slow reproduction, double-speed reproduction or high-speed reproduction referred to as cue or review. It is desirable to avoid the generation of noise on the display screen when effecting such variable speed reproduction of the recorded video signal.

In order to improve the recording density by omitting guard bands between the successive slant tracks recorded on the magnetic tape, conventional rotary head VTRs employ at least two heads at diametrically opposed locations on a rotating drum for alternately scanning the successive tracks, with the two heads having differently angled gaps so that different azimuth angles are employed for recording signals in the adjacent tracks. For example, as shown on FIG. 1, a magnetic tape T may have slant tracks A1, A2, ... in each of which one field of a video signal is recorded by means of a first head with a respective azimuth angle, and which alternate with slant tracks B1, B2 ... in each of which one field of a video signal is recorded by a second head with a different azimuth angle. In the normal reproducing mode of the VTR, the heads Ha and Hb alternately scan the tape T in the direction indicated by the arrow Xh, while the tape is transported in the direction of the arrow Xt at the normal speed, that is, at the same tape speed as was used during recording, so that the heads Ha and Hb will alternately scan the tracks A1, B1, A2, B2, A3 ..., respectively. Since the heads used for reproducing fields of the video signal recorded in the several tracks have the same azimuth angles as were used for recording such fields of the video signal in those tracks, the reproduced fields of the video signal have uniformly high levels. Further, since the head scanning any one of the slant tracks for reproducing the video signal field recorded therein has an azimuth angle different from that of the head used in recording the adjacent tracks, cross-talk from such adjacent tracks is minimized.

A number of systems are known for achieving relatively noise-free variable speed reproduction, for example, still reproduction or slow reproduction.

A first system for achieving substantially noise-free variable speed reproduction employs a pair of rotary heads Ha and Hb that are diametrically opposed on the rotary drum DR, as on FIG. 2A, and having relatively broad head widths to extend over two tracks when the drum DR is rotated at the frame frequency, that is, when the rotary drum completes a full revolution in each frame period. In the still reproducing mode, the tape T is stopped at a position in which the trace 40A alternately scanned by the heads Ha and Hb extends over two adjacent tracks A2 and B2.

In a second system for achieving substantially noise-free variable speed reproduction, the rotary head-carrying drum DR again has a pair of diametrically opposed heads Ha and Hb with different azimuth angles, and an additional head Ha' with the same azimuth angle as the head Ha is mounted on the drum DR close to the head Hb, as shown on FIG. 2B. In the still reproducing mode of a VTR according to this second system, the tape T is stopped at a position in which the heads Ha and Ha' alternately scan a trace $40b$ (FIG. 1) which substantially intersects the center of a track, for example, the track A1, that was recorded by a head having the same azimuth angle as the heads Ha and Ha'.

A third system proposed for achieving noise-free variable speed reproduction converts the reproduced signal into a digital signal which is written into a field memory, and the read out from the field memory is controlled to provide a substantially noise-free reproduced signal. However, this third system is disadvantageous in that it requires A/D and D/A converters, a field memory, a read-out control circuit, and the like which increase the cost, size and power consumption of the corresponding apparatus so that it is difficult to apply such system to a compact, hand-held video reproducing and displaying apparatus.

Noise-free variable speed reproduction with the above-described first and second systems will now be explained with reference to FIG. 3 in which the tape running direction XT is represented by the abscissas and the ordinates represent time, that is, the successive fields F1, F2, F3 ....

In the normal reproducing mode of the VTR embodying the first system, that is, having only the diametrically opposed heads Ha and Hb, such heads Ha and Hb alternately scan the tracks A1, B1, A2, B2, ... in sequence, as indicated by the obliquely extending line 41 on FIG. 3. When slow reproduction is effected by means of the two heads Ha and Hb, tracking is effected as indicated by the oblique line 42 on FIG. 3. In such case, in order to achieve substantially noise-free slow reproduction, the tape T is transported intermittently, that is, the tape movement undergoes repetitive cycles in each of which the tape is stopped for a predetermined interval and then transported at the normal reproducing speed for another predetermined interval, rather than being merely transported continuously at a speed slower than the tape transporting speed used for recording. The slow-motion ratio is equivalent to the ratio, in each repeated cycle, between the time during which the tape is stopped and the time during which the tap is transported at the normal speed. In the example illustrated by FIG. 3, still reproduction, in which the heads Ha and Hb (indicated at a and b on the drawing for the sake of simplicity) alternately move along the trace 40a on FIG. 1, and thus scan the tracks A2 and B2, is effected in the fields F1–F4 while so-called "frame sending", in which the tape T is transported at the normal speed, is effected during the 4-field period of the fields F5–F8. At the commencement of the next cycle of slow reproduction, still reproduction, in which the heads Ha and Hb alternately scan the tracks A3 and B3, is effected in the field F9 (and of course in the three fields subsequent thereto). The level of the reproduced signal RF1 during the still reproducing phase of the slow reproducing mode gradually increases during each field in which a track recorded with the same azimuth angle as the head Ha, for example, the track A2, is scanned by the head Ha, and the level of the reproduced signal RF1 gradually decreases during each field in which a track recorded with the same azimuth angle as the head Hb, for example, the track B2, is scanned by the head Hb. On the other hand, in the frame sending phase of the slow reproduction mode, the level of the reproduced signal RF1 is not substantially reduced to a small level and, consequently the generation of noise in the picture then reproduced is substantially avoided.

In the case of the second system described above with reference to FIG. 2B and in which three heads Ha, Hb and Ha' are mounted on the rotary drum DR, tracking in the slow reproduction mode is indicated by the oblique line 43 on FIG. 3. Once again, slow reproduction is achieved by means of a repeated cycle involving an interval of still reproduction and an interval or phase of frame sending. In the illustrated example, the interval of still operation occurs until the field F4, with the heads Ha and Ha' alternately scanning the track A1 along the trace 40b on FIG. 1 during such interval with the result that the corresponding reproduced signal RF2 (FIG. 3) has a maximum level at the center of each of the fields F1–F4 and decreases only slightly at the beginning and end of each field. During the frame sending interval of each cycle of slow reproduction, the heads Ha and Hb are alternately operative to scan respective tracks on the tape while the latter is transported at its normal speed, with the result that the level of the reproduced signal RF2 is then almost the same as that achieved in the normal reproducing mode.

In the still reproducing mode of the VTR having three heads Ha, Hb and Ha', the tracking indicated by the oblique line 44 on FIG. 3 is effected, that is, the heads Ha and Ha' alternately scan a track, for example, the track A1, which was recorded by a head having the same azimuth angle as the heads Ha and Ha'.

Further, in the event of a cue/review operation in which the tape T is transported at a high speed in the reverse direction, the tracking indicated by the oblique line 45 on FIG. 3 is effected.

In the case where the slow reproducing mode is achieved by intermittent transporting of the tape at the normal speed while using only the two heads Ha and Hb, as described above, it is difficult to obtain an ample level of the reproduced signal RF1 so that the quality of the reproduced picture is inadequate. Further, since frame reproduction is effected in the still reproducing operation, vibration occurs in the reproduced picture due to a field time difference in the case of pictures containing fast movements. Moreover, in the case of VTRs having two different tape speeds for normal reproducing, for example, for normal play and for extended play, it is difficult to adapt the slow reproducing mode to both tape speeds. More specifically, in this respect, if the head width is determined so that a guard band is not provided between the adjacent tracks when operating at the relatively high or normal tape speed, such head extends over three or more tracks when operating in the extended play mode characterized by a slow tape speed. On the other hand, if the head width is determined so that the head extends over no more than two tracks when using the slow tape speed, then guard bands are produced between the adjacent tracks when using the relatively higher tape speed characteristic of the normal play, thereby making noise-free slow reproduction impossible.

Although the above described system using the rotary drum with the three heads Ha, Hb and Ha' is advantageous, as compared with the system using only two rotary heads, in that the picture quality is improved and field reproduction can be effected, the increased number of heads increases the cost of the apparatus. Furthermore, in the case of VTRs using a small-size rotary drum with four heads thereon instead of the single pair of heads Ha and Hb so as to permit a reduction in the overall size of the VTR, it is very difficult to further increase the number of heads by adding heads corresponding to the head Ha' in FIG. 2B.

OBJECTS AND SUMMARY OF THE INVENTION

Accordingly, it is an object of this invention to provide an apparatus for displaying a noise-free picture in response to the variable speed reproduction of a recorded video signal by a VTR having only a pair of rotary recording/reproducing heads of reduced head width.

More specifically, it is an object of this invention to provide a video signal display apparatus with a liquid crystal display unit in which, in any period in which the reproduced video signal level is insufficient, for example, during variable speed reproduction, the liquid crystal display unit continues to provide a display based on a video signal of sufficient level reproduced during a previous field.

Still another object of the present invention is to provide a video signal display apparatus, as aforesaid, which is capable of providing a stable display during variable speed reproduction by providing a quasi-vertical synchronizing signal to a control circuit of the liquid crystal display unit for use in place of the vertical synchronizing signal of the reproduced video signal during variable speed reproduction.

In accordance with an aspect of this invention, there is provided a video signal display apparatus having a liquid crystal display unit with liquid crystal cells arranged in a matrix for displaying a display signal developed from an input video signal, for example, as reproduced by a VTR, wherein the supplying of a scanning signal to the liquid crystal display unit is inhibited during a period in which an unnecessary portion of the video signal is provided, for example, as when the input video signal is derived from the VTR in a variable speed reproducing mode, and wherein, during such inhibition of the supplying of the scanning signal to the liquid crystal display unit, the latter is made to continuously display the display signal previously supplied to the liquid crystal cells.

In accordance with another aspect of the present invention, there is provided a video signal display apparatus having a liquid crystal display unit with liquid crystal cells arranged in a matrix for displaying a display signal developed from an input video signal, as aforesaid, and wherein, at the time when the supplying of a scanning signal to the liquid crystal display unit is inhibited during a period in which an unnecessary portion of the video signal is provided, an external and vertical synchronizing signal is provided to a control circuit of the liquid crystal display unit and the scanning of the liquid crystal display unit is timed on the basis of such external and vertical synchronizing signal.

The above, and other objects, features and advantages of the invention, will be apparent in the following detailed description thereof which is to be read in connection with the accompanying drawings.

BRIEF DESCRIPTION OF THE DRAWINGS

FIGS. 6A-6H are timing charts to which reference will be made in explaining the operation of the video signal display apparatus of FIG. 4;

FIGS. 7A-7C are timing charts to which reference will be made in explaining the operation of an inversion switch circuit included in the apparatus of FIG. 4;

FIGS. 8A-8F are timing charts to which reference will be made in explaining the operation of the video signal display apparatus of FIG. 4 when the video signal input thereto is derived from a VTR in its slow reproducing mode;

FIGS. 10A-10E are timing charts to which reference will be made in explaining the operation of the apparatus of FIG. 4 when the associated VTR is in a cue/review reproducing mode.

DETAILED DESCRIPTION OF A PREFERRED EMBODIMENT

Figure 4:
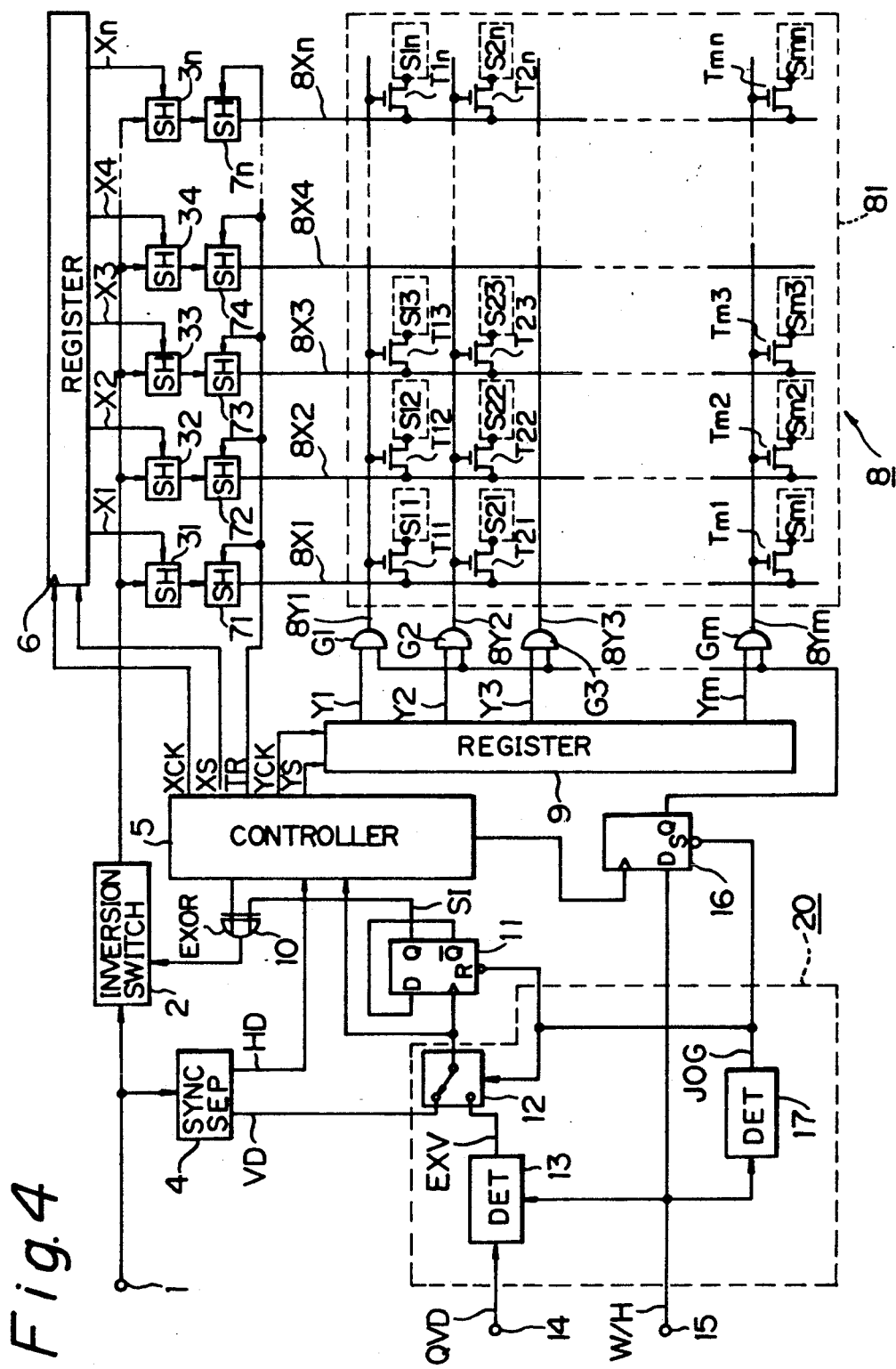
FIG. 4 is a block diagram illustrating a video signal display apparatus in accordance with an embodiment of the present invention.

Referring now to FIG. 4, it will be seen that a video signal display apparatus according to an embodiment of the present invention has an input terminal 1 for receiving a reproduced video signal from a rotary head-type VTR which may be of the kind described above with reference to FIG. 2A. The reproduced video signal is supplied from the input terminal 1 through an inversion switch circuit 2 to a number of sample/hold circuits 31, 32, 33, 34, . . . 3n which correspond to the number of pixels or picture elements to be included in each horizontal line of the video display. The inversion switch circuit 2 determines the polarity of the video signal, as supplied to the sample/hold circuits 31, 32, . . . 3n, in accordance with an inversion control signal provided as hereinafter described in detail.

A sync separating circuit 4 is connected to the input terminal 1 for separating a vertical synchronizing signal VD and a horizontal synchronizing signal HD from the input video signal. The separated horizontal synchronizing signal HD is supplied to a controller 5 of a liquid crystal display unit 8. The separated vertical synchronizing signal VD is supplied to one input terminal of a switch circuit 12 which, at another input terminal, receives an external and vertical synchronizing signal EXV. As hereinafter described in detail, the switch circuit 12 selects either the vertical synchronizing signal VD or the external and vertical synchronizing signal EXV to be supplied from the output of the switch circuit 12 to the controller 5.

The controller 5 suitably generates timing pulses in synchronism with the input horizontal synchronizing signal and vertical synchronizing signal. More specifically, the controller 5 generates a horizontal start pulse XS corresponding to the starting end of each line of an effective picture, a horizontal clock XCK corresponding to each pixel or picture element in a horizontal line, a transfer signal TR corresponding to the end of a horizontal scan or line, a vertical start pulse YS corresponding to the start of a vertical scan, and a vertical clock pulse YCK corresponding to each horizontal scan.

The horizontal start pulse XS and the horizontal clock XCK are supplied to a register 6 which extends in the horizontal direction. Output signals X1, X2, X3, X4, . . . Xn, whose phases are sequentially shifted and formed by the horizontal clock XCK, are produced by the register 6 at each horizontal start pulse XS. The output signals X1, X2, . . . Xn are applied to the sample/hold circuits 31, 32, . . . 3n, respectively, as sampling pulses therefor. As a result of the foregoing, the signals corresponding to picture elements in each horizontal line or scan are sampled and held at the sample/hold circuits 31-3n.

Output signals from the sample/hold circuits 31, 32, 33, . . . 3n are applied to sample/hold circuits 71, 72, 73, . . . 7n, respectively, and the transfer signal TR from the controller 5 is supplied to the sample/hold circuits 71, 72, 73, . . . 7n as a sampling pulse therefor. As a result of the foregoing, in the horizontal period which follows the occurrence of the transfer signal TR, display signals held in the sample/hold circuits 71, 72, 73, . . . 7n are supplied therefrom to first signal lines 8X1, 8X2, 8X3, . . . 8Xn, respectively, of the liquid crystal display unit 8. The liquid crystal display unit 8 further has second signal lines 8Y1, 8Y2, 8Y3 . . . 8Yn extending orthogonally relative to the first signal lines 8X1, 8X2, 8X3, . . . 8Xn; liquid crystal cells S11, S12, . . . S1n, S21, S22, . . . S2n, and Sm1, Sm2, . . . Smn located at the intersections of such first and second signal lines; and opposed electrodes 81 indicated in broken lines on FIG. 4. Since the embodiment of the invention being here described employs an active matrix system in the liquid crystal display unit 8, the latter includes transistors T11, T12, T13, . . . T1n; T21, T22, T23, . . . T2n; and Tm1, Tm2, Tm3, . . . Tmn, which are preferably in the form of thin film transistors (TFT) and act as switching elements. More specifically, control electrodes of the transistors T11-T1n, T21-T2n, and Tm1-Tmn are connected to the signal lines 8Y1-8Ym, respectively; input electrodes of the transistors T11, T21, ... Tm1, T12, T22, ... Tm2, ... and T1n, T2n, ... Tmn are connected to the signal lines 8X1-8Xn, respectively; and output electrodes of the transistors T11-Tmn are connected to the liquid crystal cells S11-Smn, respectively. By supplying scanning signals to the control electrodes of the transistors T11-Tmn through the signal lines 8Y1-8Ym, the transistors are selectively turned ON so that the display signals then applied to the signal lines 8X1-8Xn are supplied to the respective liquid crystal cells S11-Smn.

Although the liquid crystal display unit 8 in the specifically described embodiment of this invention has an active matrix system in which switching elements are interposed between the liquid crystal cells and the electrodes, with such switching elements being constituted by transistors of the 3-terminal type, it will be apparent that the present invention can be similarly applied to liquid crystal display units having a simple matrix system for directly driving the liquid crystal cells by respective matrix electrodes, or to liquid crystal display units with an active matrix system in which the switching elements are of the 2-terminal type using a non-linear resistance element, such as, a diode ring, a back-to-back diode, or an MIM (metal-insulated-metal) diode.

Scanning signals Y1, Y2, Y3, ... Ym are supplied from a register 9 through AND gates G1, G2, G3 ... Gm, respectively, to the signal lines 8Y1, 8Y2, 8Y3, ... 8Ym. The vertical start pulse YS and the vertical clock YCK from the controller 5 are supplied to the register 9 which generates the scanning signals Y1-Ym accordingly, with the phases of such scanning signals being shifted sequentially at every horizontal period. The transistors T11—T1n, T21-T2n, ... Tm1-Tmn, connected to the signal lines 8Y1, 8Y2, ... 8Ym, respectively, are turned ON when the scanning signals Y1, Y2, ... Ym supplied to the respective signal lines have the value "1". When the transistors T11-Tmn are thus selectively turned ON, display signals held in the sample/hold circuits 71-7n are supplied through the signal lines 8X1-8Xn and the turned-ON transistors to the respective liquid crystal cells S11-Smn for displaying the respective video signal.

A control or enabling signal from a D flip-flop 16 is applied to each of the AND gates G1-Gm for determining when the latter are enabled to pass the scanning signals Y1-Ym from the register 9 to the respective transistors. The D flip-flop 16 receives a write/hold control signal W/H from an input terminal 15 and synchronizes the same with a pulse of a horizontal frequency derived from the controller 5 for providing the control signal to the AND gates G1-Gm. In the normal reproducing mode, the control signal W/H remains at the high level or value "1" so that the AND gates G1-Gm are enabled at the horizontal or scanning frequency and thereby supply the scanning signals Y1, Y2, Y3, ... Ym to the respective transistors. However, in the still and slow reproducing modes of the associated VTR, the control signal W/H is inverted, or changed over between the low level or value "0" and the high level or value "1" at every field. Therefore, in the still and slow reproducing modes of the VTR, the AND gates G1-Gm are in their blocking or non-enabled state during each field in which the control signal W/H has the low level or value "0". In such blocking or non-enabled state of the AND gates G1-Gm, the signal lines 8Y1-8Ym are, in effect, open so that the transistors T11-Tmn are turned OFF and the respective liquid crystal cells S11-Smn continue to display the display signals applied thereto in a prior field of the video signal.

Instead of employing the AND gates G1-Gm controlled by the output of the D flip-flop 16 for determining when the scanning signal Y1-Ym are applied to the signal lines 8Y1-8Ym, the output of the D flip-flop 16 could be applied directly to the register 9 so that the scanning signals Y1-Ym would issue therefrom to the signal lines 8Y1-8Ym only during those fields in which the control signal W/H is "1", and further so that the signal lines 8Y1-8Ym would be, in effect, open during any field in which the control signal W/H is "0".

A control signal for the inversion switch circuit 2 is supplied to the latter from an Exclusive OR gate 10 so that, in the normal reproducing mode of the associated VTR, the circuit 2 inverts the polarity of the video signal transmitted thereto at every horizontal period and also at every field period. Such inverting of the video signal by the circuit 2 avoids deterioration of the displayed picture quality due to cross-talk between signals reproduced from adjacent scanned tracks, and also prevents destruction of the liquid crystal cells of the display 8 due to the application of direct currents thereto. The polarity of the target potential applied to the opposed electrodes 81 is similarly inverted. The Exclusive OR gate 10 receives from the controller 5 a control signal which is inverted at every horizontal period and at every field period. The Exclusive OR gate 10 also receives an output signal SI from a D flip-flop 11.

The D flip-flop 11 is connected to function as a ½ dividing circuit and, for that purpose, has its negative output Q fed back to the data input D, while the output of the switch circuit 12 is connected to the clock input of the D flip-flop 11. A detection signal JOG for controlling the switch circuit 12 and for resetting the D flip-flop 11 is produced by a vertical synchonrization control circuit 20. When the associated VTR is in its normal reproducing mode, the signal JOG has the value "0" and the D flip-flop 11 is reset with the result that the output signal SI from the Q output of the D flip-flop 11 is maintained at the value "0". As a result of the foregoing, the control signal produced by the controller 5, and which is inverted at each horizontal period and at each field period, is output, without change, from the Exclusive OR gate 10. On the other hand, in the variable speed reproducing mode of the VTR, the detection signal JOG becomes "1", the D flip-flop 11 operates as a ½ dividing circuit, the signal SI is inverted at every horizontal line and at every two fields, and the polarity of the video signal is inverted every two fields by the inversion switch circuit 2.

A detector 13 for generating an external and vertical synchronizing signal EXV and a detector 17 for generating the above-mentioned detection signal JOG are provided in the vertical synchronization control circuit 20. A quasi-vertical synchronizing signal QVD is supplied through a terminal 14 to the detector 13, and the write/hold control signal W/H is supplied from the terminal 15 to the detectors 13 and 17. The quasi-vertical synchronizing signal QVD may be suitably developed, for example, in a micro-computer or a pulse generator (not shown), from a switching pulse SWP (FIG. 6B). Similarly, the control signal W/H may be developed by a micro-computer or a pulse generator (not shown) in response to the selected operation mode of the associated VTR and the switching pulse SWP. The write/hold control signal W/H may also be developed by detecting the level of the reproduced signal obtained from the rotary heads.

Figure 5:
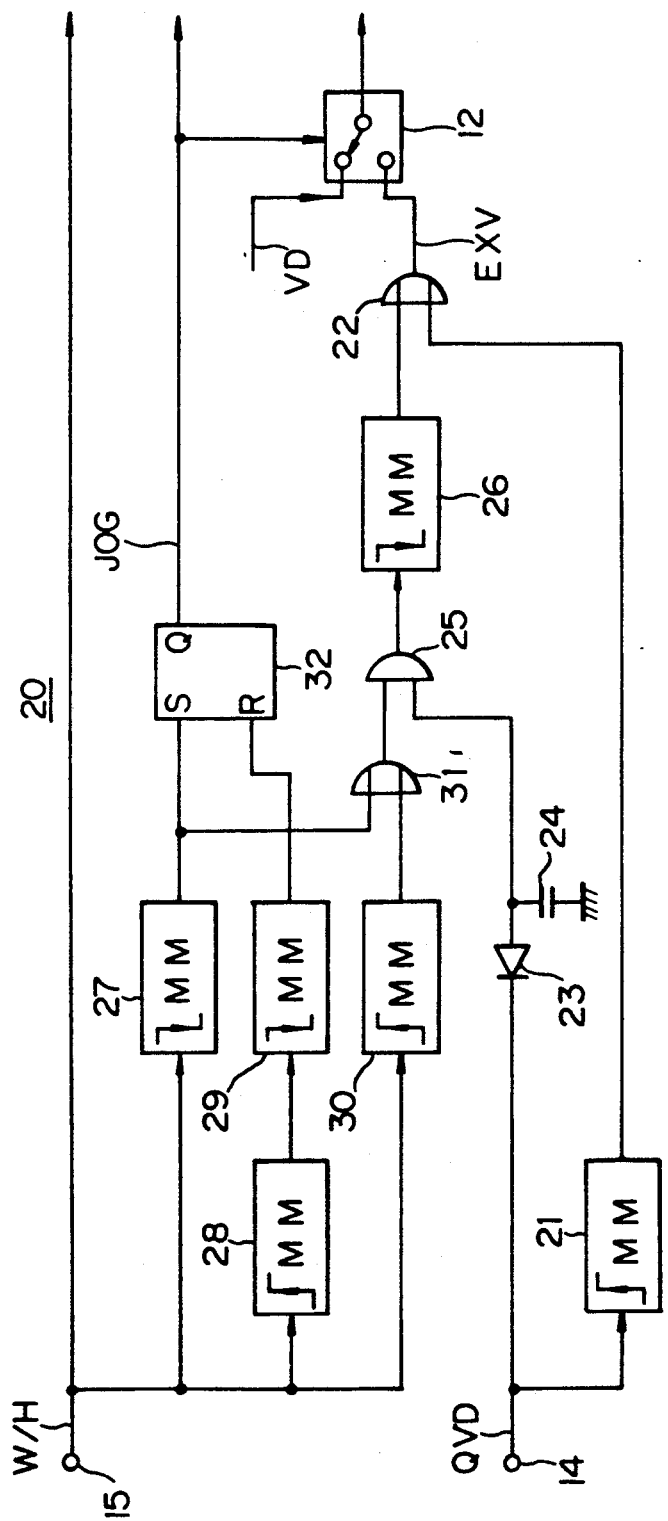
FIG. 5 is a block diagram showing in greater detail a vertical synchronization control circuit included in the apparatus of FIG. 4.

Referring now to FIG. 5, it will be seen that, in the vertical synchronization control circuit 20, the detector 13 to which the quasi-vertical synchronizing signal QVD from the input terminal 14 is supplied may comprise a monostable-multivibrator (hereinafter referred to as a "mono-multi") 21 which is triggered by the leading edge of the signal QVD. The mono-multi 21 has a delay time corresponding to the pulse width of the vertical synchronizing signal VD separated from the video signal, for example, 3H (in which H is one horizontal period). The output signal of the mono-multi 21 is supplied to one input of an OR gate 22 which, at its output, provides the external synchronizing signal EXV applied to one input of the switch circuit 12, as described above.

The quasi-vertical synchronizing signal QVD is also shown to be supplied to an integrating circuit composed of a diode 23 and a capacitor 24. The output signal from such integrating circuit 23, 24 is supplied to one input of an AND gate 25.

The vertical synchronization control circuit 20 in the embodiment of this invention presently being described has a structure adapted for use with two kinds of quasi-vertical synchronizing signals. More specifically, when the reproduced signal is from a VTR capable of only still reproduction in its variable speed reproducing mode, a direct current-like quasi-vertical synchronizing signal QVD having the level "1" is supplied to the terminal 14. On the other hand, if the associated VTR is capable of still reproduction, slow reproduction, cue/review reproduction, and the like, then a pulse-like quasi-vertical synchronizing signal QVD which is similar to the vertical synchronizing signal VD is applied to the terminal 14. In the case of the direct current-like quasi-vertical synchronizing signal QVD, the output of the integrating circuit 23, 24 is "1" and thereby enables the AND gate 25 so that the output signal of an OR gate 31 is supplied through the enabled AND gate 25 to a mono-multi 26 for triggering the latter and causing the resulting output of the mono-multi 26 to be supplied to the OR gate 22. In the case of the pulse-like quasi-vertical synchronizing signal QVD, the output of the integrating circuit 23, 24 is relatively low so that the AND gate 25 is blocked or non-enabled, whereby the mono-multi 26 is not triggered and the output signal from the mono-multi 21 is passed through the OR gate 22 to the respective input terminal of the switching circuit 12.

In the case of an associated VTR capable only of normal reproduction and still reproduction, it is possible to form the external and synchronizing signal EXV from the write/hold control signal W/H because the timing of the quasi-vertical synchronizing signal QVD is constant. However, in the case of a VTR that is also capable of slow reproduction, it is necessary to generate an external and vertical synchronizing signal EXV having a controlled phase. Moreover, in the case of an associated VTR also capable of cue/review reproduction, the period of the write/hold control signal W/H becomes short during such cue/review reproduction so that it is not possible to develop the external and vertical synchronizing signal from the control signal W/H.

The generation of the detection signal JOG indicative of the variable speed reproducing operation and the development of the external and vertical synchronizing signal during still reproduction will now be further described in detail with reference to FIG. 5. As noted above, the control signal W/H from the input terminal 15 is supplied to the data input D of the D flip-flop 16 (FIG. 4). Such control signal W/H is also shown on FIG. 5 to be supplied to 3 mono-multi's 27, 28 and 30. The control signal W/H always has the level or value "1" during normal reproduction and is inverted at the time of variable speed reproduction. The mono-multi 27 is triggered by the trailing edge of the control signal W/H, and the mono-multi's 28 and 30 are triggered by the leading edge of the control signal W/H. The mono-multi 28 is a retriggerable mono-multi and has a delay time Tτ, for example, a delay time of 1.5 field periods. Another mono-multi 29 is connected to the output of the mono-multi 28 and is triggered by the trailing edge of the output signal from the mono-multi 28.

The output signal of the mono-multi 27 is applied to a set input S of a RS flip-flop 32 and is also applied to an input of an OR gate 31 which, at its other input, receives the output of the mono-multi 30. The output pulse of the mono-multi 29 is applied to a reset input R of the flip-flop 32 and the detection signal JOG is obtained from the output Q of the flip-flop 32. The detection signal JOG assumes the value "1" in response to the inverting or fall of the input control signal W/H, and changes over to the low value or level "0" at a time which is 1.5 field periods after the rise of the control signal W/H, as shown on FIG. 6E. As a result, the detection signal JOG is "0" during normal reproduction and is "1" during variable speed reproduction.

A pulse signal is generated at the output of the OR gate 31 in response to the rise and fall of the control signal W/H, but delayed relative thereto by the delay time of the mono-multi's 27 and 30. The length of such delay time of the mono-multi's 27 and 30 is selected so that the timing of the leading edge of the vertical synchronizing signal VD in the still reproducing mode corresponds to the timing of the trailing edge of the output signal from the OR gate 31.

The mono-multi 26 is triggered by the trailing edge of the output signal of the OR gate 31 which is supplied through the AND gate 25. The delay time of the mono-multi 26 corresponds to the pulse width of the vertical synchronizing signal VD. The output signal of the mono-multi 26 is supplied to the OR gate 22. During still reproduction, since the output signal of the OR gate 31 is supplied to the mono-multi 26 through the AND gate 25, an external and vertical synchronizing signal EXV developed from the control signal W/H is employed.

Figure 1:
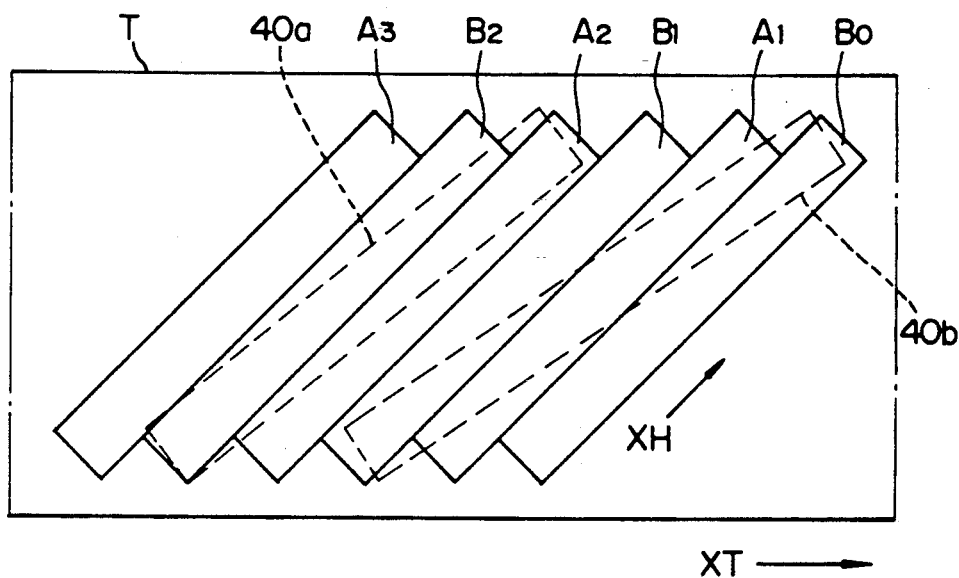
FIG. 1 is a schematic diagram illustrating a length of magnetic tape on which successive fields of a video signal are recorded in slant tracks, and to which reference is made in explaining slow and still reproduction according to the prior art.
Figure 2A:
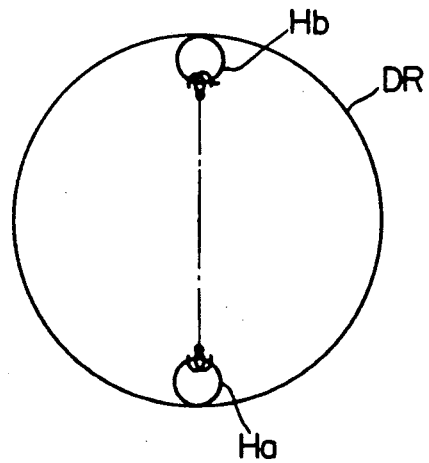
FIGS. 2A and 2B are schematic diagrams showing head arrangements employed in VTRs according to the prior art.
Figure 2B:
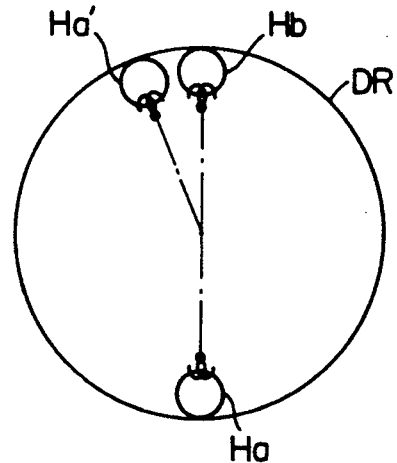

A variable speed reproduction operation will now be described for an embodiment of the present invention associated with a VTR having a pair of heads Ha and Hb diametrically opposed to each other on the rotary drum DR, as in FIG. 2A, and which are used for both normal reproduction and variable speed reproduction. Initially, an operation in a still reproducing mode will be explained with reference to FIGS. 6A–6H and FIGS. 7A–7C. In the still reproducing mode, the tape is stopped and the heads Ha and Hb alternately and repeatedly scan the tape along the trace 40b in FIG. 1 which, for example, is centered in respect to a track A1 which was recorded by the head Ha, or at least by a head having the same azimuth angle.

In the example illustrated by FIGS. 6A–6H, the still reproduction operation is effected for a 4-field period that follows a period of normal reproducing operation, with the normal reproducing operation being reinstated at the conclusion of the 4-field period of still reproducing operation. The vertical synchronizing signal VD separated from the reproduced video signal by the sync separating circuit 4 (FIG. 4) is shown in FIG. 6A, and FIG. 6B illustrates the switching pulse SWP which is in phase with the rotation of the head-carrying drum DR. Thus, in a field of the reproduced video signal in which the head Ha scans the tape, the switching pulse SWP has the value "1", whereas the switching pulse SWP has the value "0" during each field of the reproduced video signal in which the tape is scanned by the head Hb. For the sake of simplicity, the portions of the switching pulse SWP corresponding to the scanning of the tape by the heads Ha and Hb are indicated at a and b, respectively.

As shown in FIG. 6C, the level of the reproduced signal RF decreases gradually in a field in which the head Hb is scanning the tape while the tape speed is being reduced at the initiation of the still reproducing mode. As shown in FIG. 6D, the control signal W/H continuously has the level or value "1" during normal reproduction and is inverted at every field during still reproduction, and beginning one field prior to the commencement of the actual still reproduction operation. Since the flip-flop 32 of the vertical synchronization control circuit 20 (FIG. 5) is set at the trailing edge of the control signal W/H, the detection signal JOG from the flip-flop 32 changes from "0" to "1" at the beginning of the first field in which the control signal W/H is inverted, as is shown on FIG. 6E. Further, the detection signal JOG maintains the value "1" throughout the period in which still reproduction is effected, and is returned to the value "0" only at the time T$\tau$, which is equal to 1.5 field periods, after the last inverting of the control signal W/H, that is, the conclusion of the still reproducing operation.

The control signal W/H is sampled by the D flip-flop 16 and the output of the latter is supplied to the AND gates G1-Gm. As a result of the foregoing, in each field in which the control signal W/H is "0" (FIG. 6D), the AND gates G1-Gm are maintained in their blocked or non-enabled state so that the scanning signals Y1-Ym are not supplied from the register 9 to the signal lines 8Y1-8Ym. In this open state of the signal lines 8Y1-8Ym, the field of the reproduced video signal previously displayed by the liquid crystal cells S11-Smn continues to be displayed by the latter. Therefore, when the tape is at rest in the still reproducing mode at a position in which the heads Ha and Hb alternately scan a track that was recorded by a head having the same azimuth angle as the head Ha, each field period of the reproduced video signal occurring during the scanning of the tape by the head Hb is not displayed and the previous field of the video signal reproduced by the head Ha is displayed for another field period. Thus, displaying of a picture with substantial noise therein, such as, a field of the video signal reproduced by the head Hb when scanning a track recorded by the head Ha, is avoided. In FIG. 6F those fields in which the AND gates G1-Gm are in their blocked or non-enabled state, and thereby establish the open condition or state of the signal lines 8Y1-8Ym, are indicated at O.

Because the detection signal JOG has the value "1" in the still reproducing mode (FIG. 6E), the external and vertical synchronizing signal EXV is selected by the switch circuit 12 and fed therefrom to the controller 5 and the clock input of the D flip-flop 11. Further, when the detection signal JOG changes from the value "0" to the value "1", the D flip-flop 11 is reset thereby and thereafter operates as a ½ dividing circuit to produce the inversion control signal SI which is inverted at every two fields, as shown on FIG. 6G. During still reproduction, either the pulse-like quasi-vertical synchronizing signal QVD or the direct current-like quasi-vertical synchronizing signal QVD is supplied through the terminal 14, as shown on FIG. 6H. However, the vertical synchronization control circuit 20 is effective to generate the pulse-like external and vertical synchronizing signal EXV even from the direct current-like quasi-vertical synchronizing signal QVD. Such external and vertical synchronizing signal EXV has a phase similar to that of the vertical synchronizing signal VD indicated on FIG. 6A. More specifically, during the still reproduction period, a pulse-like external and vertical synchronizing signal EXV is developed with each pulse being delayed relative to a respective change-over of the switching pulse SWP by a delay time of $\tau$ 1.

The controller 5 of the liquid crystal display unit 8 forms a timing pulse in synchronism with the external and vertical synchronizing signal EXV, rather than in synchronism with the vertical synchronizing signal VD separated from a reproduced video signal which includes substantial noise. As a result, the timing of the video signal and of the display do not shift and a stable display is thereby ensured.

As earlier noted, the D flip-flop 11, when reset by the detection signal JOG having the value "1", frequency divides the external and vertical synchronizing signal EXV and thereby produces the inversion control signal SI. It will be further noted that, although the signal SI actually has the value "0" continuously in the normal reproducing mode, as indicated by a broken line on FIG. 6G, the signal SI is shown inverted at each field period in the normal reproducing mode, for easy understanding of the change-over to the inversion at every two fields due to the frequency dividing function of the D flip-flop 11 in the still reproducing mode. In any event, the signal SI is supplied to one input of the Exclusive OR gate 10 which, at another input, receives a control signal generated by the controller 5 and which has its phase inverted at every line (1H) and at every field (1V), as shown specifically on FIG. 7B. On the basis of such control signal from the controller 5 and the signal SI from the D flip-flop 11, the Exclusive OR gate 10 provides an output to the inversion switch circuit 2 by which the polarity of the video signal is controlled as shown on FIG. 6F, where the symbols + and − indicate the controlled polarities of the video signal in the first line of each field after action thereon by the inversion switch circuit 2.

The above inversion control operation will now be further explained with reference to FIGS. 7A-7C. As earlier noted, and as shown specifically in FIG. 7A, during still reproduction, the control signal SI is inverted at every two fields (2V). The control signal supplied to the Exclusive OR gate 10 from the controller 5 is shown on FIG. 7B which, along with FIG. 7C, is drawn with its time axis enlarged relative to that of FIG. 7A. As earlier noted and shown on FIG. 7B, the control signal from the controller 5 has its phase inverted at every line and at every field and coacts with the control signal SI in the Exclusive OR circuit 10 to provide, at the output of the latter, the inversion switch control signal shown in FIG. 7C. During normal reproduction in which the signal SI applied to the Exclusive OR gate 10 is maintained at the value "0", the control signal received by the Exclusive OR gate 10 from the controller 5 and having the wave form shown on FIG. 7B, is passed through the Exclusive OR gate 10 without change. As a result of the foregoing, during normal reproduction, the polarity of a video signal supplied through the inversion switch circuit 2 to the liquid crystal display unit 8 is inverted at every line and at every field.

During still reproduction, the signal SI (FIG. 7A) is supplied to the Exclusive OR gate 10 to provide a control signal (FIG. 7C) to the inversion switch circuit 2 which is inverted at every line (1H) and at every two fields (2V). Consequently, the polarity of the video signal supplied from the inversion switch circuit 2 to the liquid crystal display unit is inverted at every line and at every two fields.

Figure 3:
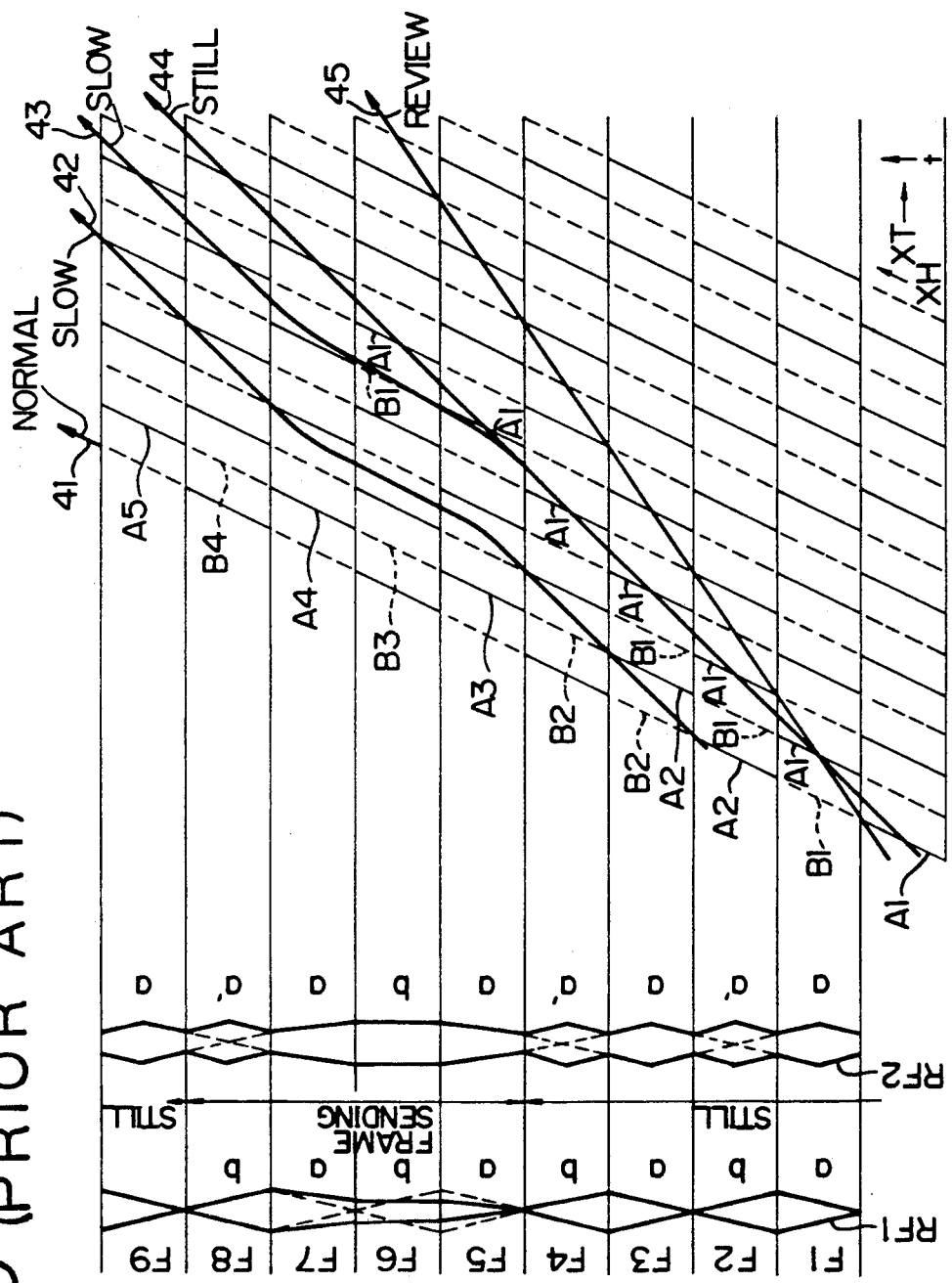
FIG. 3 is a schematic diagram to which reference is made in explaining variable speed reproducing operations of VTRs having the head arrangements of FIGS. 2A and 2B according to the prior art.

Operation of the apparatus embodying the present invention during slow reproduction will now be explained with reference to FIGS. 8A–8F. Once again, the VTR associated with the video signal display apparatus embodying this invention is assumed to be of the type previously described with reference to FIG. 3 and in which slow reproduction of the recorded video signal is effected by intermittently transporting the recorded tape so that there are repeated cycles in which still reproduction is alternated with normal reproduction during which so-called "frame sending" is effected.

During each interval of still reproduction, the reproduced video signal from one head, for example, the head Ha, is displayed while the heads Ha and Hb alternately scan the tape along the trace 40b on FIG. i, as described above. The switching pulse SWP which is generated in synchronism with the scanning of the tape by the heads Ha and Hb is shown on FIG. 8A where the symbols a and b identify fields of the video signal reproduced by the heads Ha and Hb, respectively. As shown in FIG. 8B, the video signal RF reproduced during each field when the head Hb scans the tape along the trace 40b on FIG. 1 is of low level. Therefore, in accordance with the present invention, during each interval of still reproduction included in the repeated cycle of still reproduction and normal reproduction or frame sending employed for achieving slow reproduction, the video signal display apparatus in accordance with this invention inhibits the displaying of each field of the video signal reproduced by the head Hb and, during such field period, continues to display the field of the video signal previously reproduced by the head Ha.

In the example illustrated by FIG. 8B, four fields F5, F6, F7 and F8 are normal reproduction or frame sending periods, and the field periods that are prior to, and subsequent to the frame sending periods are still reproduction periods.

Figure 9:
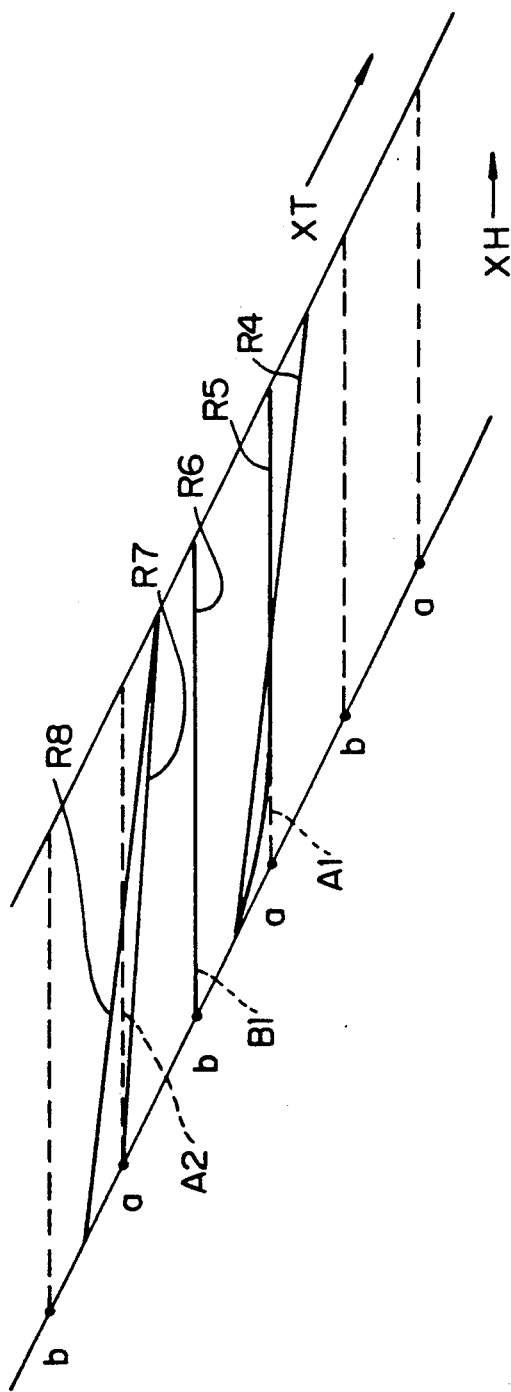
FIG. 9 is a schematic diagram to which reference will be made in explaining the tracking effected in the slow reproducing mode.

Referring now to FIG. 9 which illustrates the tracking during slow reproduction, it will be seen that the lines R4, R5, R6, R7 and R8 represent scanning traces of the rotary heads during the fields F4, F5, F6, F7 and F8, respectively. During the field F4, the head Hb scans along the trace R4 at the conclusion of an interval of still reproduction. Since the tape is at rest at a position where the trace R4 intersects the track A1 substantially at the mid-portion of the latter, the reproduced video signal RF from the head Hb is of very low level at the middle of the field F4 (FIG. 8B). Commencing with the next field F5, the tape is accelerated from rest up to its normal speed in the direction of the arrow XT on FIG. 9 so that, in the latter half of the field F5, the trace R5 followed by the head Ha nearly coincides with the track A1 which was recorded by a head having the same azimuth angle as the head Ha. Accordingly, at the end of the field F5, the video signal reproduced by the head Ha has achieved a normal level. In the next field F6, the track B1 next to the track A1 coincides with the trace R6 of the head Hb. During the initial half of the next field F7, the trace R7 of the head Ha almost coincides with the track A2, but the trace R7 of the head Ha moves progressively away from the track A2 during the latter half of the field F7 as deceleration of the tape movement is initiated, so that the level of the reproduced video signal decreases (FIG. 8B). In the next field F8 in which the tape speed is further decreased, the head Hb moves along the trace R8 which intersects the track A2 at the middle of the latter (FIG. 9) so that the level of the reproduced video signal RF is substantially decreased at the middle of the field F8 (FIG. 8B).

In the slow reproducing mode, during each interval of frame sending, that is, each interval in which the tape is transported at its normal speed, the reproduced timing of the vertical synchronizing signal VD recorded at the starting portion of each track on FIG. 9 varies from the reproduced timing of the vertical synchronizing signal VD during the still reproduction interval. The recorded position of the vertical synchronizing signal VD is usually determined with the phase of the switching pulse SWP (FIG. 8A) as a reference. The quasi-vertical synchronizing signal QVD (FIG. 8C) supplied to the terminal 14 (FIGS. 4 and 5) in the slow reproducing mode has a phase similar to that of the vertical synchronizing signal VD as will be apparent from a comparison of FIGS. 6A and 8C. The external and vertical synchronizing signal EXV is, developed from the quasi-vertical synchronizing signal QVD, as is apparent from FIG. 5.

In the slow reproducing mode, the control signal W/H shown in FIG. 8D is supplied to the terminal 15 (FIGS. 4 and 5) during the intervals of still reproduction and normal reproduction, and as a result thereof the control signal SI (FIG. 8F) for inversion control is similar to that previously described for the still reproducing mode with reference to FIG. 6G. Therefore, as shown in FIG. 8E, the polarity of the reproduced video signal at the output of the inversion switch circuit 2 is controlled in a manner similar to the previous description of the polarity control for still reproduction, and the operation of the liquid crystal display unit 8 is also similarly controlled. In other words, the transmission to the liquid crystal display unit 8 of each field of the reproduced video signal identified in FIG. 8E by a 0 at the beginning thereof is inhibited and the liquid crystal display unit 8 then continues to display a prior field of the reproduced video signal. Thus, only substantially noise-free fields of the reproduced video signal are displayed by the apparatus embodying the present invention even when the associated VTR is operating in its slow reproducing mode.

In the cue/review reproducing mode of the associated VTR, the tape speed is increased to be an even multiple of the normal tape speed. Therefore, during each field indicated by the switching pulse SWP (FIG. 10A) which is synchronized with the rotation of the heads Ha and Hb on the rotary drum DR, the level of the reproduced video signal RF varies repeatedly and the phase of such level variations changes from field to field, as shown on FIG. 10B. A pulse signal (FIG. 10C) is formed on the basis of the level change of the reproduced video signal RF, and the write/hold control signal W/H (FIG. 10D) having a duty ratio of ½ is generated from the pulse signal of FIG. 10C, or from a suitably provided signal indicative of the kind of reproducing mode that has been selected and from the switching pulse SWP (FIG. 10A). By way of example, a micro-computer or a pulse generator (not shown) supplied with the switching pulse SWP and with the signal indicating the selected reproducing mode of the VTR, for example, indicating the cue/review reproducing mode, can readily provide the control signal W/H (FIG. 10D) which is supplied to the terminal 15 (FIGS. 4 and 5) while the quasi-vertical synchronizing signal QVD shown on FIG. 10E is supplied to the terminal 14.

In the cue/review reproducing mode, the detection signal JOG is made to have the value "1" in response to the control signal W/H (FIG. 10D). Since that control signal W/H is sampled by the D flip-flop 16 (FIG. 4), the supplying of the scanning signals Y1-Ym to the liquid crystal display unit 8 is inhibited in each period in which the control signal W/H has the value "0", and such inhibition of the scanning is released in each period when the control signal W/H has the value "1". Consequently, the liquid crystal display unit 8 is made to display only those portions of the reproduced video signal which are almost of a normal level, thereby providing the display of a substantially noise-free reproduced picture. Moreover, the inversion of the polarity of the video signal applied to the display unit 8 is controlled in substantially the same manner as has been described above for the still reproducing mode and the slow reproducing mode of the associated VTR.

It will be appreciated that the present invention is also applicable to displays generated in the case of double-speed reproduction, strobe reproduction and the like. In the case of strobe reproduction in which only one field out of every predetermined number of fields is to be displayed, the control signal W/H applied to the terminal 15 in FIGS. 4 and 5 is made to assume the value "1" only during the period of each field which is to be displayed.

Further, although the invention has been described as embodied in a video signal display apparatus for use with a VTR having a pair of diametrically opposed heads on a head-carrying drum, it will be appreciated that the invention is similarly applicable to the display of the video signal reproduced by the known type of VTR having 4 heads on its head-carrying drum so as to permit substantial reduction of the diameter of the latter and a significant decrease in the overall size of the apparatus.

Furthermore, it will be apparent that the reproduced signal applied to the input terminal 1 on FIG. 4 may be a color video signal, in which case the liquid crystal display unit 8 is suitably modified or arranged so as to constitute a color liquid crystal display unit.

By way of summary, it will be noted that, in accordance with this invention, for each field of a reproduced video signal which is substantially free of noise, a write state is established and scanning signals are supplied to the liquid crystal display unit, whereas, in any field of the reproduced signal which is unnecessary and contains substantial noise, such as, a reproduced video signal generated in the still reproducing mode of a VTR, the supplying of scanning signals to the liquid crystal display unit is inhibited, and a substantially noise-free reproduced signal of a prior field continues to be displayed. Furthermore, at the time of variable speed reproduction, for example, in the still reproducing mode, there is the danger that a vertical synchronizing signal separated from the reproduced video signal will be adversely affected by noise and, as a result thereof, vertical synchronization of the liquid crystal display unit will not be properly achieved and a vibration will appear in the displayed picture. In order to avoid the foregoing problem, in accordance with the present invention, at the time of variable speed reproduction by the VTR, the vertical synchronization of the liquid crystal display unit is established with reference to a quasi-vertical synchronizing signal for ensuring a stable display of the picture.

Having specifically described a preferred embodiment of the present invention and modifications thereof, it is to be understood that the invention is not limited to that precise embodiment and the described modifications thereof, and that various changes and further modifications may be effected therein by one skilled in the art without departing from the scope or spirit of this invention as defined in the appended claims.

What is claimed is:

1. An apparatus for displaying video signals input from a VTR having at least a pair of diametrically opposed rotary heads and being capable of at least a normal reproducing mode in which said heads output substantially noise-free video signals reproduced from respective scanned tracks on a tape, and a still reproducing mode in which video signals reproduced by said heads alternatively contain substantial noise or are substantially noise-free, respectively, said apparatus comprising:

means for developing display signals from said video signals reproduced by said heads;

a liquid crystal display unit including a plurality of liquid crystal cells arranged in a matrix, and means for applying said display signals to said liquid crystal cells for display by the latter in response to the reception of periodic scanning signals;

means for generating said periodic scanning signals; and means for selectively inhibiting the supplying of any of said periodic scanning signals to said liquid crystal display unit for selected fields of the input video signal when a video signal reproduced by one of said heads contains substantial noise and for continuing the display by said liquid crystal cells of the display signals previously supplied to said liquid crystal cells in correspondence to a substantially noise-free video signal.

2. An apparatus for displaying video signals according to claim 1; wherein said liquid crystal display unit further includes a plurality of first signal lines for receiving said display signals, a plurality of second signal lines arranged orthogonally in respect to said first signal lines and to which said periodic scanning signals are applied, and switching elements arranged at intersections of the orthogonally arranged first and second signal lines and through which said display signals are transmitted to respective ones of said liquid crystal cells in response to said periodic scanning signals.

3. An apparatus for displaying video signals according to claim 1; wherein said liquid crystal display unit further includes a plurality of first signal lines for receiving said display signals, a plurality of second signal lines for receiving said periodic scanning signals and being arranged orthogonally in respect to said first signal lines, and electrodes in opposing relation to each other with said liquid crystal cells therebetween at positions corresponding to intersections of said orthogonally arranged first and second signal lines and with said display signals being directly applied to said liquid crystal cells upon the occurrence of said periodic scanning signals on the respective second signal lines.

4. An apparatus for displaying video signals according to claim 1; wherein said means for inhibiting the supplying of said periodic scanning signals to said liquid crystal display unit includes gating means interposed between said means for generating the periodic scanning signals and said liquid crystal display unit, and means for opening said gating means to pass said periodic scanning signals only during periods corresponding to the reproduction by said heads of relatively noise-free video signals which are desired to be displayed.

5. An apparatus for displaying video signals according to claim 1; wherein said VTR is further capable of a variable speed reproducing mode comprised of alternating operations in said normal an still reproducing modes, respectively; and wherein said means for selectively inhibiting the supplying of said periodic scanning signals to said liquid crystal display unit is operative only when said VTR in said still reproducing mode and during an operation in said still reproducing mode when said VTR is in said variable speed reproducing mode.

6. An apparatus for displaying video signals according to claim 1, further comprising means for providing a write and hold signal to control the supplying of said display signal to said cells when said VTR is in said still reproducing mode, and means for developing an external and vertical synchronizing signal from said write and hold signal.

7. An apparatus for displaying video signals according to claim 1; further comprising means for generating an external and vertical synchronizing signal; and means for controlling the timing of the scanning of said liquid crystal display unit on the basis of said external and vertical synchronizing signal during the reproduction by said one head of the video signal containing substantial noise.

8. An apparatus for displaying video signals according to claim 7; wherein said liquid crystal display unit further includes a plurality of first signal lines for receiving said display signals, a plurality of second signal lines arranged orthogonally in respect to said first signal lines and to which said periodic scanning signals are applied, and switching elements arranged at intersections of said orthogonally arranged first and second signal lines and through which said display signals are transmitted to respective ones said liquid crystal cells in response to said periodic scanning signals.

9. An apparatus for displaying video signals according to claim 7; wherein said liquid crystal display unit further includes a plurality of first signal lines for receiving said display signals, a plurality of second signal lines for receiving said periodic scanning signals and being arranged orthogonally in respect to said first signal lines, and electrodes in opposing relation to each other with said liquid crystal cells therebetween at positions corresponding to intersections of said orthogonally arranged first and second signal lines and with said display signals being directly applied to said liquid crystal cells upon the occurrence of said periodic scanning signals on the respective second signal lines.

10. An apparatus for displaying video signals according to claim 7; wherein said means for inhibiting the supplying of said periodic scanning signals to said liquid crystal display unit includes gating means interposed between said means for generating the periodic scanning signals and said liquid crystal display unit, and means for opening said gating means to pass said periodic scanning signals only during periods corresponding to the reproduction by said heads of relatively noise-free video signals which are desired to be displayed.

* * * * *